United States Patent [19]

Brower

[11] 4,451,741
[45] May 29, 1984

[54] ELECTRONIC CONTROL FOR AN AUTOMOBILE AIR CONDITIONER

[76] Inventor: George H. Brower, 1628 English Pl., Crofton, Md. 21114

[21] Appl. No.: 439,761

[22] Filed: Nov. 8, 1982

[51] Int. Cl.³ .............................................. H01N 43/06
[52] U.S. Cl. ............................ 307/10 R; 307/132 E; 307/141; 361/196
[58] Field of Search ............ 307/10 R, 132 R, 132 E, 307/135, 140, 141; 361/196, 198, 142

[56] References Cited

U.S. PATENT DOCUMENTS

| | | | |
|---|---|---|---|
| 3,673,413 | 6/1972 | Lee | 361/142 X |
| 4,097,791 | 6/1978 | Bivens et al. | 307/141 X |
| 4,204,128 | 5/1980 | Kruper | 361/196 X |
| 4,206,613 | 6/1980 | Shockley | 307/10 R X |

Primary Examiner—George H. Miller, Jr.
Assistant Examiner—Derek Jennings

[57] ABSTRACT

The invention is an improved control for an air conditioner unit in an automobile. The control operates on a time cycle basis instead of using a sensor of air temperatures. The installation is simple, requiring the severing of an electrical lead in the automotive electrical system and making three electrical connections from the invention to the wiring of the automotive electrical system. The invention consists of an adjustable range control, an interval timer, and a relay driver. This combination is connected to the magnetic clutch of the air conditioning unit.

7 Claims, 6 Drawing Figures

ELECTRONIC CONTROL FOR AN AUTOMOBILE AIR CONDITIONER

BACKGROUND AND SUMMARY OF THE INVENTION

The invention relates to controls and in particular to controls for air conditioner units. Specifically, the invention relates to an electronic control that operates on a timing cycle basis instead of using a sensor of air temperatures.

Most controls of the prior art that are used for air conditioners in automobiles are more or less similar. Basically, the controls are manually operated to turn the air conditioner unit "on" or "off". The air conditioner thereafter runs continuously. In some of the prior art systems the operator can adjust an additional control that establishes a temperature level that ranges from cool to hot, however, the air conditioning unit continues to operate without interruption.

Some prior art systems have been introduced which add an additional automatic control that senses the temperature and shuts down the operation of the air conditioner unit when the temperature reaches a preselected level. As the temperature of the air changes with the air conditioning unit shut down, the sensor detects the change at a predetermined level and again turns the air conditioning unit on for operation. This alternating on and off operation repeats itself as the sensor picks up the temperature levels which have been predetermined or preselected.

The air conditioner controls operate a magnetic clutch means that alternately engages or disengages as the controls indicate, either by a manual operation made by the person in the automobile, or automatically by a control that is operated by a temperature sensor. The magnetic clutch engages with the engine power unit to provide drive power for the air conditioning unit.

The present invention provides a control means that is based upon a timing cycle that operates the on and off switch on a time cycle that the operator preselects. The timing cycle operating the air conditioning concurrently, thereby, controls the air temperature by the length of the on and off cycles. In this manner the present invention also saves fuel automatically during the time the air conditioner is not operating, in comparison to most prior art controls that operate continuously unless shut off manually. When in the "off" mode the air conditioner magnetic clutch is disengaged.

In those cars where the on and off cycle is controlled by a temperature sensor, the structure is a somewhat expensive arrangement and normally is found in only a small percentage of automobiles in the luxury class and is usually done at the factory.

In other than the luxury class of automobiles, the adjustment controls usually fall into two major classes. The first is a control of the speed of the fan, the higher the speed of the circulating fan motor, the more cool air is available; the slower the speed of the fan, the less cooling is apparent. The important point is that this change in speed of the fan by the manual control does not reduce the fuel cost of operating the compressor for the cooling. The operation of the air conditioner is continuous because the magnetic clutch is engaged.

The other control is a temperature control that is operated manually. This is usually a lever that slides or can otherwise be adjusted, manually, between positions of full cold and minimum cold, the latter actually being "hot" when in a heating mode. This control actually adjusts the amount of hot water that flows in a coil system in the combined heating/cooling exchanger system. In other words, this actually combines a heated input with a cooled input (both via coils) in the duct system through which the fan circulates air. Therefore, the fuel cost is the same, whether operating at so-called "full cold" or "minimum cold", or anywhere in between.

In the present invention the control is of the actual time the cooling cycle is in the "on" mode. The "on" cycle engages the magnetic clutch and at the end of the preselected timed cycle the magnetic clutch is automatically disengaged when the cycle goes to the "off" position. Thus, fuel is saved until the next "on" cycle requires fuel for the operation. In the present invention all of this is done automatically by the timing cycle.

The present invention consists of a very small compact unit approximately $1\frac{1}{4}'' \times 1\frac{1}{2}'' \times 2\frac{1}{2}''$ in size with a control knob to adjust or select the desired timed cycle from an off position to the desired cycle. The savings in fuel is proportionate to the length of the timing cycle. The longer the "on" portion of the timing cycle, the less the fuel savings.

The present invention may be connected into the air conditioning system of any car. The installation may be made with the simple cutting of a wire in the existing air conditioning system, and connecting three wires from the control unit of the present invention into the wiring of the air conditioning system. Once installed, the present invention does not interfere with operating the air conditioning system by using the regular controls if so desired.

It is, therefore an object of the invention to provide an air conditioning control system that is based on a timing cycle.

It is also an object of the invention to provide an air conditioning control system for automobiles.

It is another object of the invention to provide an air conditioning control system that will save fuel or energy.

It is still another object of the invention to provide an air conditioning control system that requires the severance of only one wire in the wiring of an existing air conditioning control system.

It is yet another object of the invention to provide an air conditioning system that requires the connection of only three wires from the system to the wiring of an existing air conditioning system.

It is yet still another object of the invention to provide an air conditioning control system that is contained in a small compact enclosure.

Further objects and advantages of the invention will become more apparent in light of the following description of the preferred embodiments.

DESCRIPTION OF THE PREFERRED EMBODIMENTS

Figure 1:
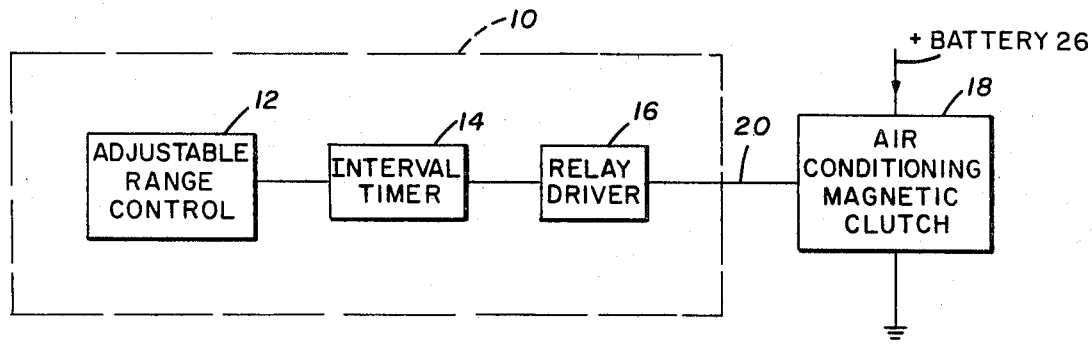
FIG. 1 is a pictorial schematic block wiring diagram of a timed cycle air conditioning control system.
Figure 2A:
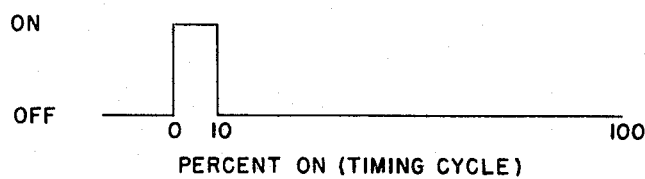
FIG. 2A is an illustration of a short timing cycle in the "on" mode of a timed cycle air conditioning control system.
Figure 2B:
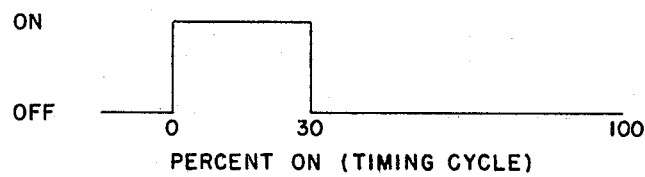
FIG. 2B is an illustration of a medium timing cycle in the "on" mode, similar to FIG. 2A.
Figure 2C:
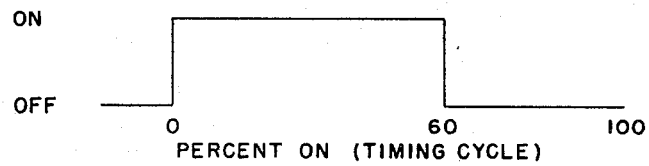
FIG. 2C is an illustration of an intermediate timing cycle in the "on" mode, similar to FIG. 2A.
Figure 2D:
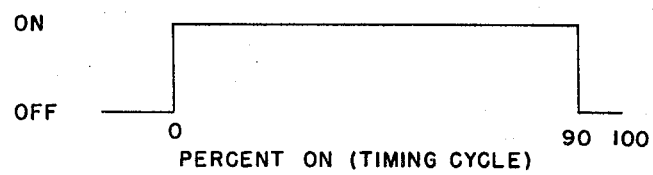
FIG. 2D is an illustration of a long timing cycle in the "on" mode, similar to FIG. 2A.

Referring now to the drawings, and particularly to FIG. 1, a block wiring diagram of a timed cycle air conditioning control system is shown at 10.

The timed cycle air conditioning control system 10 consists of an adjustable range control unit 12, an interval timer unit 14, and a relay driver unit 16. The adjustable range control unit 12, interval timer unit 14, and the relay driver unit 16 are all suitably electrically connected to each other as hereinafter described.

The timed cycle air conditioner control system 10 is electrically connected to an existing air conditioning magnetic clutch 18 of an existing air conditioning system, normally an automotive type, by suitable electrical wiring 20. The procedure for making the electrical wiring connection 20 is described hereinafter.

Figure 3:
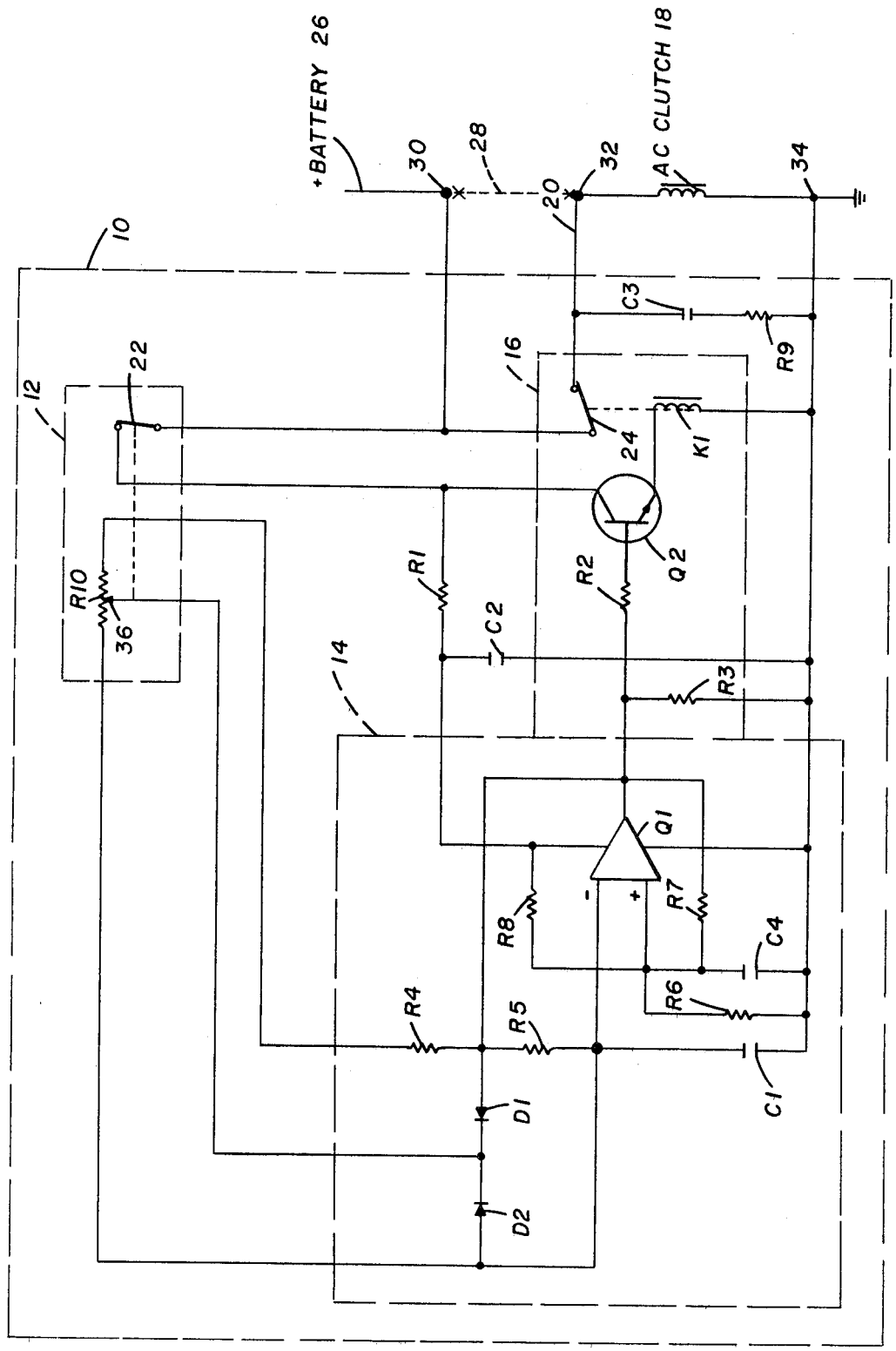
FIG. 3 is detailed wiring diagram of FIG. 1.

Turning now to FIG. 3, the wiring diagram of the timed cycle air conditioner control system 10 is shown enclosed by phantom lines, also identified as the timed cycle air conditioner control system 10.

Within the aforementioned enclosing phantom lines 10, note that the detailed wiring of the adjustable range control unit 12 is further enclosed and identified by a smaller phantom line enclosure 12. This portion of the overall wiring diagram will be described in detail hereinafter.

In a like manner, the detailed wiring of the interval timer unit 14 is also shown within the aforementioned phantom line enclosure lines 10 and identified by its own enclosing phantom lines 14.

Also in a similar manner, the detailed wiring of the relay driver unit 16 is likewise shown within the aforementioned enclosing phantom lines 10 and further identified by its own enclosing phantom lines 16.

Note that the magnetic clutch 18 of an existing air conditioning system, usually an automotive air conditioning system, is outside the timed cycle air conditioner control system 10 of this invention, and is the unit of an existing air conditioner system that the present invention controls on a timed cycle basis. Also, note that the power supply of the existing air conditioner system, indicated by the battery 26, is also outside the timed cycle air conditioner control system 10. Also note that the timed cycle air conditioner control system 10 is electrically connected to the battery 26 and receives a power supply therefrom as will be described hereinafter.

In the following description of the installation and operation of the timed cycle air conditioner control system 10, the electronic units shown in FIG. 3 will be explained.

When the timed cycle air conditioner control system 10 device is installed for use, the existing electrical connection from the power supply means 26 to magnetic clutch 18 is severed, as shown by the dotted line 28. The dotted line 28 indicates that after the existing electrical connection from the battery 26 to the magnetic clutch 18 is severed, the two ends, indicated by small x's, are separated for connections to the timed cycle air conditioner control system 10 device as described hereinafter.

The timed cycle air conditioner control system 10 device has three wires or terminals 30, 32 and 34 on the exterior thereof. Wire or terminal 30 is for connection of one end of the severed wire 28 thereto, the end leading from the battery 26. Wire or terminal 32 is for connection of the other end of the severed wire 28 thereto, the end leading to the magnetic clutch 18.

Note that these connections at wires or terminals 30 and 32 may be made in two ways. When the timed cycle air conditioner control system 10 device is provided with lengths of protruding electrical wire 20 at 30 and 32, the wires can be extended to the two ends, respectively, of the severed wire 28 and electrically connected at those points. When the timed cycle air conditioner control system 10 device is provided with terminals 30 and 32, a length of electrical splicing wire can be electrically connected to each end of the severed wire 28 and then extended and connected to the terminals 30 and 32 respectively as hereinbefore described.

In a similar manner, the third wire or terminal 34 from the timed cycle air conditioner control system 10 device is connected to the existing ground means which grounds the magnetic clutch 18. This ground connection of the timed cycle air conditioner control system 10 device will be described hereinafter.

Turning now to the operation of the timed cycle air conditioner control system 10 device, the device in packaged form, such as a small enclosed box-like facility approximately $1\frac{1}{4}'' \times 1\frac{1}{2}'' \times 2\frac{1}{2}''$, is conveniently located and suitably affixed for an operator or user to reach. In an automobile this would normally be within reach of the driver at some convenient place on or immediately under the dash panel. It is to be understood that the aforementioned approximate size of the unit and the location of it for convenient use within reach of an automobile driver are for descriptive and illustration purposes only, and that the size and location may be otherwise within the scope and intent of the invention. The operation will be explained using FIG. 3.

The operator or user closes switch 22 which connects battery 26 as a direct current source voltage from the electrical system of an automobile in which the timed cycle air conditioner system 10 is to be used, to supply power for the operation of the invented control means. A current is now provided through series resistor R1 to the interval timer unit 14. Capacitor C2 in conjunction with resister R1 forms a filter network for the direct current supply voltage to amplifier Q1 to eliminate unwanted electrical disturbances that might come from the automobile electrical system and cause false timing.

The interval timer unit 14 functions as a low frequency pulse generator. The circuit includes an operational amplifier Q1, connected as a free running multivibrator with a constant frequency determined by capacitor C1 and resistor R5, and a variable pulse width determined by potentiometer R10 and diodes D1 and D2. The potentiometer R10 will be discussed further when the adjustable range control unit 12 is covered later.

The timing cycle begins when switch 22 is closed applying about 12 volts from the automobile battery 26 as supply voltage to operational amplifier Q1. The voltage at the output of operational amplifier Q1 will immediately be caused to rise to the high state, which is a positive voltage near the full value of the supply voltage. The output voltage of operational amplifier Q1 is held to a high state due to the feedback of positive voltage through resistor R7 and the resistor divider network R6 and R8, which are connected to the + input (the non-inverting input) of the operational amplifier Q1. Capacitor C4 acts as a filter to noise spikes and to stabilize the high gain operational amplifier circuit.

The multivibrator action begins with the charging of capacitor C1 with the charge path formed by the high state output voltage of the operational amplifier Q1 connected through resistor R5 to capacitor C1. The connection also of capacitor C1 to the − input (the inverting input) of the operational amplifier Q1 applies a voltage that increases with time until it exceeds the voltage level on the + input of operational amplifier Q1. This causes operational amplifier Q1 to change state with the output of operational amplifier Q1 immediately dropping from the high state to a low state near zero volts. The output now remains low due to the decrease in voltage applied back through resistor R7 and shifting the + input of operational amplifier Q1. A reverse condition now also takes place with the high state voltage charge on capacitor C1 being discharged back through resistor R5 to the low state output level of operational amplifier Q1. This discharge continues with time until the voltage level on capacitor C1 as applied to the − input of operational amplifier Q1 is below the + input, at which point operational amplifier Q1 again changes output state from low to high. This completes one full timing cycle with each cycle following in the same manner as capacitor C1 is alternatively charged and discharged between two voltage levels determined by the shifting of the reference voltage on the + input of the operational amplifier Q1 by the feedback of output voltage through resistor R7. The cycle of the interval timer unit 14 now needs to be controlled to select a different time for the charging versus the discharging of capacitor C1, so that the percentage of "on" time can be selected. This is determined by the adjustment of potentiometer R10 and the connection with the diodes D1 and D2.

During the period of the timing cycle when the output of operational amplifier Q1 is in the high state, the charging path of capacitor C1 includes resistor R5 as already stated, but also includes the path through diode D1 which is forward biased and in series with that portion of potentiometer R10, of the adjustable range control unit 12, from the movable R10 contact 36 to the end of potentiometer R10 connected to capacitor C1.

At one end of adjustment of potentiometer range control R10 where a minimum value of resistance is in series with diode D1, the charging time of capacitor C1 will be very fast, so that the change of state or "on" time will be very brief. Capacitor C1 has reached a full charge and now begins the discharge which includes not only resistor R5 but diode D2 in series with the full portion of potentiometer R10 from the movable R10 contact 36 to the end connected in series with resistor R4 to the low state output voltage level of operational amplifier Q1. The dischage path is therefore very slow, and the "off" time will be very long.

Conversely, as the adjustment of the potentiometer R10 is changed to the other end of its range, the charging time of capacitor C1 will now be long and the "on" time of operational amplifier Q1 will be a high percentage of the total timing cycle. Resistor R4 is included so that as potentiometer R10 is set to the end corresponding to minimum "on" time of the air conditioning magnetic clutch 18, that this "on" time be limited to about 10% of the timing cycle. This prevents a condition of operation where there is no air conditioning effect at all, and provides a comfortable setting for most moderate climates.

The pulse generator circuit of the interval timer unit 14 is connected to the circuit of the relay driver unit 16. Resistor R3 provides a fixed load for the operational amplifier Q1. The output of operational amplifier Q1 is fed into the base of transistor Q2 through current limiting resistor R2.

The collector of the transistor Q2 is connected to switch 22 and battery source 26. The emitter of transistor Q2 is connected to the coil of relay K1. The contacts 24 of relay K1 are connected in series between battery 26 and air conditioning magnetic clutch 18.

To complete the cycle of operation, when the output of operational amplifier Q1 is high, current will flow into the base of transistor Q2, switching it to the conductive state, which in turn energizes relay K1 and opens relay contacts 24. This interrupts the flow of current from the battery 26 to the air conditioning magnetic clutch 18 and "disengages" the clutch during the "off" portion of the timing cycle.

Capacitor C3 in series with resistor R9 provide a path for current transients from the large inductive coil in the air conditioning magnetic clutch 18 when the relay contacts 24 open, shunting transient spikes to ground terminal 34.

In the adjustable range control unit 12 the switch 22 is a knob-type control means. A slight turn or twist of the control knob means engages the contacts so that the switch is in the "on" mode. Concurrently, the shaft of the knob-type control means, indicated by the dotted line in the adjustable range control unit 12, turns and moves the movable R10 contact 36 to a relative selected position by the operator or user. This sets the device for the length of timed cycle for which the device is to operate. As the movable R10 contact 36 passes over the contact area of the potentiometer R10, the contact is always in an "on" mode after being switched "on" initially.

As the movable R10 contact 36 adjusts the potentiometer for a selected timed cycle, the actual operation will engage the magnetic clutch 18 for the length of the timed cycle so selected. Four illustrations of such timed cycles are illustrated in FIGS. 2A, 2B, 2C, and 2D. These drawings indicate the "on" cycle when the magnetic clutch 18 is engaged for ten percent, thirty percent, sixty percent, and ninety percent of the time when the vehicle is in operation. The balance of the time the magnetic clutch 18 is disengaged when the air conditioning is not required for comfort conditions.

Thus, the invention works entirely on the basis of a timed cycle. There is no sensor of air temperatures involved. This has many advantages. First, the installation can be made into any automobile without the difficulty of installing air temperature sensors for inside air, outside air, or air conditioning duct temperature. Second, the invention circuit is simple, low cost, and has no precision parts or critical calibration standards as often used with temperature controllers. Therefore, the reliability and field service will be much better. This is a unique application of the timed cycle of this invention.

The savings is directly related to the percentage of time that the air conditioner magnetic clutch 18 is "declutched". The savings can be great (90%) on many days) because air conditioners are over-designed or designed for the worst case condition of mid-day sun on a clear day in tropical climates. Therefore, most normal operating conditions will allow a setting with high "savings".

It is also to be noted that when the switch 22 is in the "off" position, or open, the electronic control circuit is entirely disabled and this permits the air conditioner magnetic clutch 18 to be operated in the normal manner with the original controls of the system. However, in this mode the air conditioner operates continuously and does not save fuel as the present invention does.

Regarding the aforementioned FIGS. 2A, 2B, 2C and 2D, it is to be noted that as the knob type control of switch 22 is operated, the switch 22 closes and the timed cycle begins. At this position the potentiometer R10 contact is at the end to correspond to nearly full "on" of the timing cycle. By continuing the turning of the knob control, which is always in a "contact mode", the potentiometer R10 contact 36 gradually changes position on the potentiometer R10 and corresponding the percentage of "on" time is reduced until the desired selected percentage of "on" time is reached. In other words, the switch 22 is closed throughout the whole range of control of potentiometer R10 and percentage of "on" time. At the end of the range control corresponding to full "on" time, the control has an "off" position which opens switch 22 thus disabling the electronic control circuit and connecting the air conditioner magnetic clutch 18 to the regular controls in the car system.

In normal operation the existing air conditioning control means is used to turn the air conditioning unit on and to adjust to the level of coolness of the air desired, however, at that point the system is in a continuous operation mode and uneconomical. The electronic timed cycle air conditioning control system 10 of this invention is then switched on and the desired time cycle is selected. Thereafter the timed cycle air conditioning control system 10 will effect the fuel savings by declutching the magnetic clutch 18 at the proper times.

The circuit of this invention is also designed for the relay contacts 24 to be normally closed when either the interval timer 14 or the relay driver 16 is in the low state or not powered. This insures that if any component fails that the system would "fail safe" to allow the normal air conditioning mode to remain.

As can be readily understood from the foregoing description of the invention, the present structure can be configured in different modes to provide the ability to control an air conditioning system by timed cycles.

Accordingly, modifications and variations to which the invention is susceptible may be practiced without departing from the scope and intent of the appended claims.

What is claimed is:

1. An electronic control for an air conditioner, comprising:
    an adjustable range control means, said adjustable range control means being a potentiometer, said potentiometer having a range of operation, said adjustable range control means having a knob-like switch means therewith, said knob-like switch means serving as a main switch for turning on said electronic control for an air conditioner, said knob-like switch means further being connected to and serving as a means of adjusting said potentiometer through its said range of operation, said knob-like switch means being capable of remaining in an "on" contact mode while serving as said means of adjusting said potentiometer through its said range of operation;
    an interval timer means, said interval timer means being electrically connected to said adjustable control means;
    a relay driver means, said relay driver means being electrically connected to said interval timer means;
    an electrical wiring circuit, said electrical wiring circuit interconnecting said adjustable range control means, said interval timer means, and said relay driver means;
    an enclosure means, said enclosure means housing and enclosing said adjustable range control means, said interval timer means, said relay driver means, and said electrical wiring circuit, said enclosure means having three electrical connection means, said three electrical connection means being externally located on said enclosure means and each being electrically connected to said electrical wiring circuit, and an operational amplifier, a first resistor, a second resistor, a third resistor, a fourth resistor, a fifth resistor, a sixth resistor, and a seventh resistor, a first capacitor, a second capacitor, and a third capacitor, a first diode, and a second diode, said interval timer means being centered around said operational amplifier, said interval timer means having power supplied to it through said first resistor, said first resistor in conjunction with said first capacitor forming a filter network for said operational amplifier as power is supplied to it, said operational amplifier operating as a free running multivibrator with a constant frequency determined by said second capacitor and said second resistor, said interval timer functioning as a low frequency pulse generator, a variable pulse width being determined by said potentiometer and said first and second diodes, said operational amplifier having an output voltage held to a high state due to feedback of positive voltage through said third resistor and a resistor divider network formed by said fourth and fifth resistors, said third, fourth and fifth resistors being connected to the noninverting input side of said operational amplifier, said third capacitor serving as a filter to noise spikes and to stabilize a high gain of the circuit of said operational amplifier, said sixth resistor being connected in series with said potentiometer for discharge of said second capacitor when reaching a full charge, said seventh resistor providing a fixed load for said operational amplifier.

2. An electronic control for an air conditioner as recited in claim 1 and additionally, a transistor, an eighth resistor, and a relay, said transister having a collector and an emitter, said relay having a coil and a pair of electrical contacts, said relay driver means being centered around said transistor, said transistor receiving the output of said operational amplifier through said eighth resistor, said collector of said transistor being electrically connectd to said knob-like switch means, and said emitter of said transistor being electrically connected to said coil of said relay.

3. An electronic control for an air conditioner as recited in claim 2 and additionally, an electrical power supply means, a magnetic clutch means, an air conditioning unit, and a mechanical power supply means, said mechanical power supply means being capable of operating said air conditioning unit, said magnetic clutch means being capable of transmitting mechanical motion from said mechanical power supply means to said air conditioning unit to operate said air conditioning unit when so engaged and coupled through said magnetic clutch means, said electrical power supply means being electrically connected to said knob-like switch means and to the first of said pair of electrical contacts of said relay, said magnetic clutch means being electrically connected to the second of said pair of electrical contacts, said magnetic clutch means being further connected to a ground means, said electrical power supply means being further connected to said operational amplifier through said knob-like switch means.

4. An electronic control for an air conditioner as recited in claim 3, wherein said electrical power supply means electrically connected to said knob-like switch means and said first of said pair of electrical contacts are so connected through the first of said three external electrical connection means on said enclosure means, said magnetic clutch means electrically connected to said second of said pair of electrical contacts is so connected through the second of said three external electrical connection means on said enclosure means.

5. An electrical control for an air conditioner as recited in claim 4 and additionally, a fourth capacitor and a ninth resistor, said fourth capacitor in series with said ninth resistor providing a path for current transients from said magnetic clutch means when said contacts of said relay are open, said current transients being shunted to a ground connection, said ground connection being made through the third of said three external electrical connection means on said enclosure means.

6. An electrical control for an air conditioner as recited in claim 5, wherein said air conditioner is an air conditioner for an automobile, said electrical power supply means is an automotive battery, said mechanical power supply means is an automobile engine, and said magnetic clutch means is an automotive-type magnetic clutch, said automotive-type magnetic clutch being capable of mechanically engaging and coupling said automobile air conditioner to said automobile engine, and further wherein the normal electrical connection from said automotive battery to said magnetic clutch means is purposefully severed, thereby creating two ends of said normal electrical connection, the first end of which is electrically connected to said first of said three external electrical connection means on said enclosure means, and the second end of which is electrically connected to said second of said three external electrical connection means on said enclosure means.

7. An electrical control for an air conditioner as recited in claim 6, wherein said adjustable range control means, said interval timer means, said relay driver means, said electrical wiring circuit, and the enumerated electronic devices are arranged as depicted in the drawings appended hereto.

* * * * *